United States Patent
Couffignal et al.

(10) Patent No.: US 10,759,542 B2
(45) Date of Patent: Sep. 1, 2020

(54) REAR ATTACHMENT OF AN AIRCRAFT ENGINE COMPRISING BREAK DETECTORS

(71) Applicant: Airbus Operations (S.A.S.), Toulouse (FR)

(72) Inventors: Jean Pierre Couffignal, Blagnac (FR); Jérôme Cassagne, Toulouse (FR); Didier Rovatti, Toulouse (FR); Thomas Deforet, Toulouse (FR); Benoit Orteu, Toulouse (FR); Michael Belin, Castelginest (FR); Miren Egana-Abarrategui, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 344 days.

(21) Appl. No.: 15/801,278

(22) Filed: Nov. 1, 2017

(65) Prior Publication Data
US 2018/0327102 A1    Nov. 15, 2018

(30) Foreign Application Priority Data
Nov. 21, 2016    (FR) ...................................... 16 61305

(51) Int. Cl.
*B64D 27/26* (2006.01)
*B64D 45/00* (2006.01)

(52) U.S. Cl.
CPC ............ *B64D 27/26* (2013.01); *B64D 45/00* (2013.01); *B64D 2027/266* (2013.01); *B64D 2027/268* (2013.01); *B64D 2045/0085* (2013.01)

(58) Field of Classification Search
CPC .. B64D 27/26; B64D 45/00; B64D 2027/266; B64D 2027/268; B64D 2045/0085; B64D 2045/008; F16B 1/0071
See application file for complete search history.

(56) References Cited

U.S. PATENT DOCUMENTS 5,303,880 A * 4/1994 Cencula ................. B64D 27/26 244/54
5,351,930 A * 10/1994 Gwinn ................... B64D 27/26 244/54

(Continued)

FOREIGN PATENT DOCUMENTS

EP    0872418 A2    10/1998
EP    0879759 A2    11/1998

(Continued)

OTHER PUBLICATIONS

French Search Report for French Application No. 1661305 dated Jul. 11, 2017.

*Primary Examiner* — Richard R. Green
*Assistant Examiner* — William L Gmoser
(74) *Attorney, Agent, or Firm* — Jenkins, Wilson, Taylor & Hunt, P.A.

(57) ABSTRACT

A rear engine attachment includes a beam attached to the reactor strut, a rudder mounted by a pivot connection on the beam about a main rotational axis, and two thrust rods each exhibiting a first end attached to the rudder and a second end attached to a front section of an engine, the two thrust rods and the rudder attached to the beam together defining a primary thrust path between the engine and the reactor strut to bear the engine thrust. For each thrust rod, the rear engine attachment exhibits a waiting fail-safe system activated in the event of a failure of the primary thrust path. The rear engine attachment includes, for each thrust rod, a break detector integral with the rudder which is provided to come into contact with the beam in the event of a failure of the primary thrust path. The attachment allows a quick inspection to be made to determine whether there has been a failure of the primary thrust path.

5 Claims, 2 Drawing Sheets

(56) References Cited

U.S. PATENT DOCUMENTS

| | | | | | |
|---|---|---|---|---|---|
| 6,296,203 | B1* | 10/2001 | Manteiga | ............... | B64D 27/18 |
| | | | | | 244/54 |
| 8,763,952 | B2 | 7/2014 | Haramburu et al. | | |
| 2005/0067528 | A1* | 3/2005 | Loewenstein | .......... | B64D 27/26 |
| | | | | | 244/54 |
| 2008/0230675 | A1* | 9/2008 | Audart-Noel | .......... | B64D 27/26 |
| | | | | | 248/554 |
| 2009/0294580 | A1 | 12/2009 | Sammito et al. | | |
| 2010/0181419 | A1* | 7/2010 | Haramburu | ............ | B64D 27/26 |
| | | | | | 244/54 |
| 2012/0012732 | A1* | 1/2012 | Zameroski | ............ | B64C 27/001 |
| | | | | | 248/638 |
| 2013/0305817 | A1* | 11/2013 | Magnin | .................. | B64D 27/26 |
| | | | | | 73/117.03 |
| 2015/0166189 | A1* | 6/2015 | Cassagne | ............... | B64D 27/12 |
| | | | | | 244/54 |
| 2015/0175268 | A1* | 6/2015 | Guillou | .................. | B64D 27/26 |
| | | | | | 244/54 |
| 2016/0090868 | A1* | 3/2016 | Brain | ..................... | B64D 27/26 |
| | | | | | 403/156 |
| 2019/0202570 | A1* | 7/2019 | Smith | .................... | B64D 45/00 |

FOREIGN PATENT DOCUMENTS

| | | | |
|---|---|---|---|
| FR | 2918644 | A1 | 1/2009 |
| FR | 2958623 | A1 | 10/2011 |

\* cited by examiner

US 10,759,542 B2

REAR ATTACHMENT OF AN AIRCRAFT ENGINE COMPRISING BREAK DETECTORS

CROSS-REFERENCE TO RELATED APPLICATION

This patent application claims priority to French patent application FR 16 61305, filed on Nov. 21, 2016, the entire disclosure of which is incorporated by reference herein.

TECHNICAL FIELD

The present disclosure relates to a rear attachment of an aircraft engine which comprises break detectors that allow the breakage of a primary thrust path to be detected and also to an aircraft comprising at least one such rear attachment.

BACKGROUND

An aircraft traditionally comprises at least one engine, in particular a turbojet engine. Beneath each wing and for each engine, the aircraft comprises a reactor strut which is fixed to the structure of the wing and which extends below the wing and the engine is suspended beneath the reactor strut.

The engine is fixed to the reactor strut by engine attachments, in particular at the front by a front engine attachment and at the rear by a rear engine attachment.

The rear engine attachment traditionally comprises a beam fixed to the reactor strut, shackles fixed between the beam and the rear section of the rear casing of the engine, a rudder mounted in mobile fashion with a pivot connection on the beam and two thrust rods fixed between the rudder and a front section of the engine.

The two thrust rods, the rudder and the beam together define a primary thrust path between the engine and the reactor strut to accept the thrust of the engine when the engine is operating under normal conditions.

The rudder is mounted by a pivot connection about a rotational axis and exhibits, for each thrust rod, a waiting fail-safe which becomes active in the event that the primary thrust path should fail (i.e. when a component of the primary thrust path is damaged), in order to limit the rotation of the rudder in response to the other thrust rod. Activation of the waiting fail-safe creates an auxiliary thrust path between the engine and the reactor strut.

During the aircraft inspection, it is necessary to check whether one or other of the waiting fail-safe systems has been active during a flight. This inspection currently requires the checking of each component and a possible dismantling of the rear engine attachment, which is relatively time-consuming and results in the aircraft being grounded.

SUMMARY

An object of the present disclosure is to disclose a rear engine attachment which makes it possible to see quickly if there has been a failure affecting the primary thrust path, without having to dismantle the rear engine attachment.

To this end, a rear engine attachment is proposed for an aircraft which is intended to attach an engine to a reactor strut, the rear engine attachment comprising:
 a beam provided to be attached to the reactor strut,
 a rudder which is mounted by a pivot connection on the beam about a main rotational axis,
 two thrust rods, each exhibiting a first end attached to the rudder by a pivot connection and a second end provided to be attached to a front section of the engine, the two thrust rods and the rudder attached to the beam together defining a primary thrust path between the engine and the reactor strut to bear the engine thrust,
 for each thrust rod, the rear engine attachment exhibits a waiting fail-safe system activated in the event of a failure of the primary thrust path,
 the rear engine attachment comprising, for each thrust rod, a break detector integral with the rudder which is provided to come into contact with the beam in the event of a failure of the primary thrust path.

A rear engine attachment of this kind therefore exhibits a break detector which is deformed when a failure has taken place during a flight, allowing the incident to be spotted.

Advantageously, each break detector is detachably attached to the rudder, such as for example by a detachable fixing structure.

Advantageously, each break detector takes the shape of a hollow cylinder.

The subject herein likewise discloses an aircraft comprising a reactor strut, an engine and a rear engine attachment according to one of the preceding variants, in which the beam is attached to the reactor strut and in which the second ends of each thrust rod are attached to a front section of the engine.

BRIEF DESCRIPTION OF THE DRAWINGS

The characteristics of the disclosure herein referred to above, as well as others, will become clearer on reading the following description of an example embodiment, the description referring to the attached, example drawings in which.

DETAILED DESCRIPTION

Figure 1:
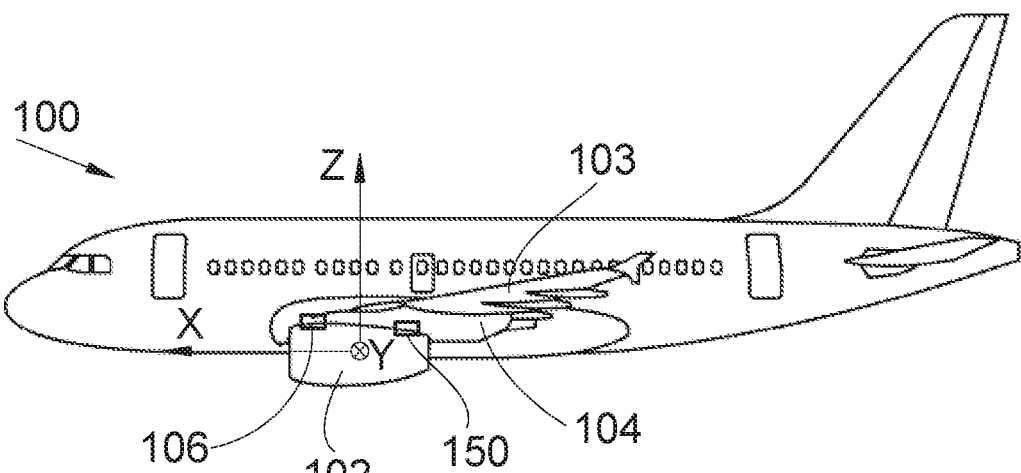
FIG. 1 is a side view of an aircraft according to the disclosure herein.

In the following description, terms relating to a position are taken to refer to an aircraft in the forward position, in other words as is shown in FIG. 1.

FIG. 1 shows an aircraft 100 which exhibits an engine 102, in particular a turbojet engine.

In the following description and as is usually the case, X refers to the longitudinal axis of the engine 102 oriented positively in the forward direction of the aircraft 100, Y refers to the transverse direction of the engine 102 which is horizontal when the aircraft is on the ground and Z to the vertical direction or vertical height when the aircraft is on the ground, these three directions X, Y and Z being at right angles to one another.

In the embodiment of the disclosure herein depicted in FIG. 1, the aircraft 100 comprises an engine 102 under each wing 103, but it is possible to provide a plurality of engines under each wing 103.

Beneath each wing 103 and for each engine 102, the aircraft 100 exhibits a reactor strut 104 which is attached to the wing structure 103 and extends beneath the wing 103. Each reactor strut 104 supports an engine 102 which is attached to the reactor strut 104 by a front engine attachment 106 and a rear engine attachment 150 according to the disclosure herein.

Figure 2:
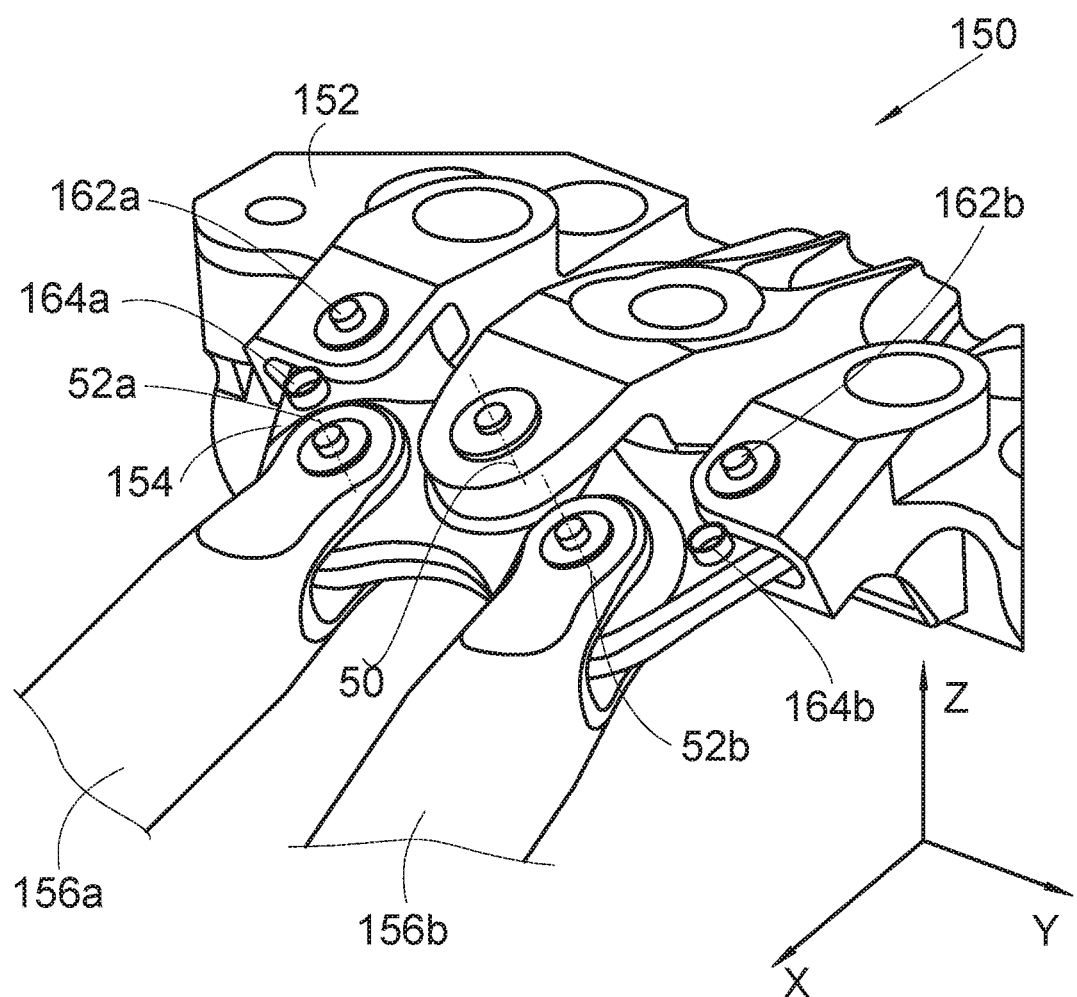
FIG. 2 is a perspective view of a rear engine attachment according to the disclosure herein.

FIG. 2 shows the rear engine attachment 150 which is fixed between the reactor strut 104 and a structural element of the engine 102, in particular the rear section of the rear engine casing, likewise referred to as the tail bearing housing.

The rear engine attachment 150 comprises a beam 152 which is attached to the reactor strut 104. The attachment of the beam 152 to the reactor strut 104 is realized by any appropriate structure, such as bolts, for example.

The rear engine attachment 150 likewise comprises a rudder 154 which is mounted by a pivot connection on the beam 152 about a main rotational axis 50. The attachment of the rudder 154 is realized by any appropriate structure such as, for example, a pin system.

Figure 3:
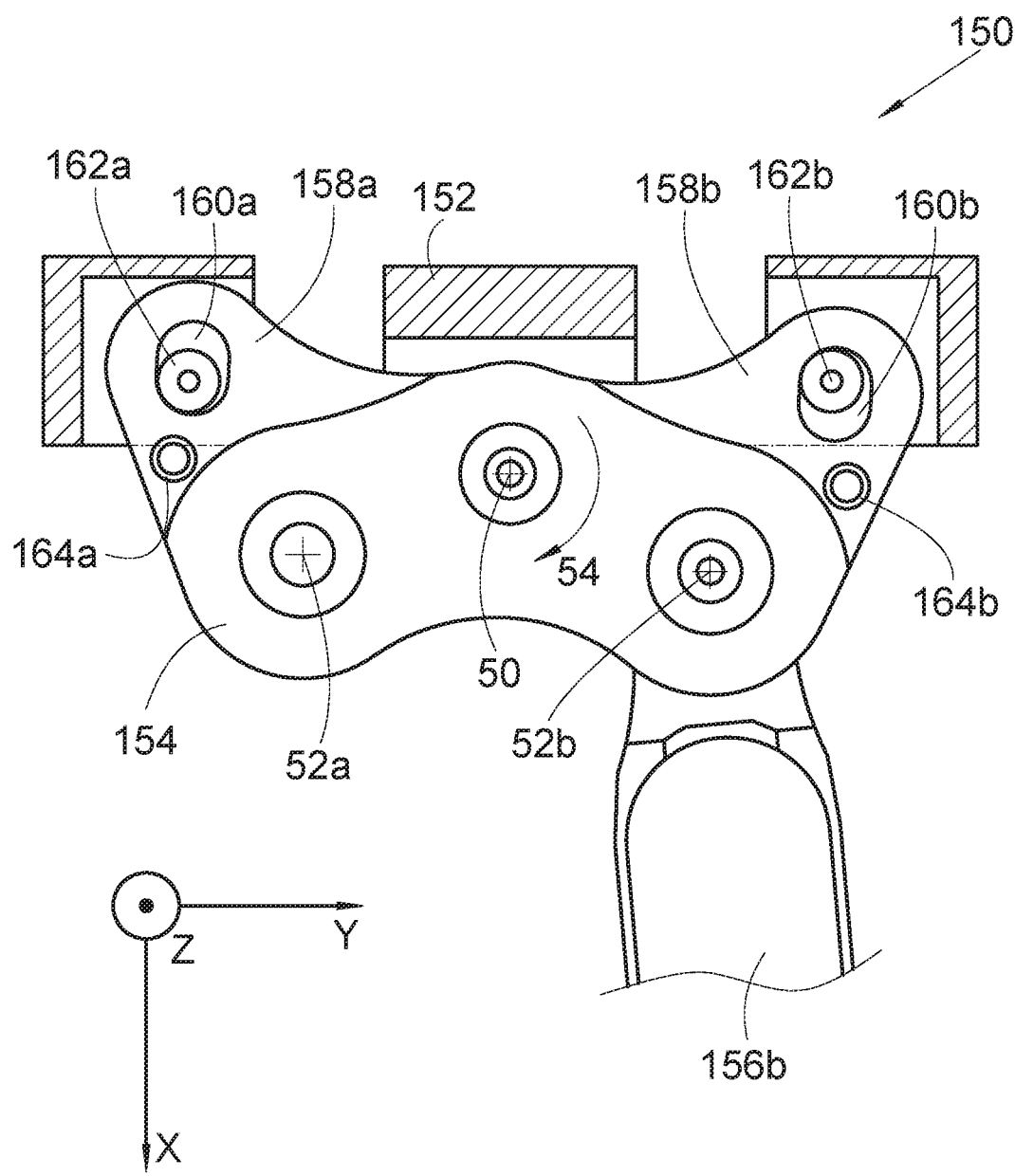
FIG. 3 is a sectional plan view of the engine attachment in FIG. 2 through a substantially horizontal plane.

FIG. 3 shows a section through the rear engine attachment 150.

On either side of the vertical plane XZ passing through the main rotational axis 50, a first end of a thrust rod 156a-b is attached to the rudder 154 by a pivot connection about a secondary rotational axis 52a-b which is substantially parallel to the main rotational axis 50. The second end of each thrust rod 156a-b is attached to a front section of the engine 102. The two thrust rods 156a-b are therefore disposed symmetrically one in respect of the other in relation to the vertical plane XZ passing through the main rotational axis 50. The two thrust rods 156a-b and the rudder 154 fixed to the beam 152 together define a first thrust path between the engine 102 and the reactor strut 104 to support the thrust of the engine when it is operating under normal conditions.

For each thrust rod 156a-b, the rear engine attachment 150 exhibits a waiting fail-safe system which rectifies a failure in the primary thrust path, in other words, when a component of the primary thrust path is damaged. The activation of the waiting fail-safe system creates an auxiliary thrust path between the engine and the reactor strut.

For each thrust rod 156a-b, the rudder 154 comprises on either side of the main rotational axis 50 and behind the first end of the thrust rod 156a-b an elongate hole 160a-b which is realized here in a lug 158a-b on the rudder 154.

Each elongate hole 160a-b is crossed by a pin 162a-b which is integral with the beam 152 and the dimensions of which are smaller than the internal dimensions of the elongate hole 160a-b, so as to allow a displacement of one in respect of the other. Each elongate hole 160a-b and the associated pin 162a-b then constitute a waiting fail-safe system.

FIG. 3 shows an operating example when one of the thrust rods 156a exhibits a failure. The rudder 154 is then subject only to the stresses transmitted by the other thrust rod 156b, which tends to make the rudder 154 pivot about the main rotational axis 50, in this case in a clockwise direction 54.

The rotation of the rudder 154 is then stopped by the interaction of the pin 162b with the walls of the elongate hole 160b.

For each thrust rod 156a-b, the rudder 154 is equipped with a break detector 164a-b which is made up of a deformable component integral with the rudder 154.

When the rudder 154 is in the nominal position, in other words the thrust rods 156a-b do not suffer any failure, each break detector 164a-b is distal from the beam 152 and is not therefore subject to any deformation, whereas when a thrust rod 156a-b suffers a failure, the rudder 154 pivots and the associated break detector 164a-b comes into contact with the beam 152 and is deformed. In other words, the break detector 164a-b is less rigid than the beam 152 at the contact between the two.

Hence, during a maintenance inspection, the lack of deformation is a sign that no incident has taken place during the flight and, even if the rudder 154 has returned to its nominal position, the presence of deformation indicates that an incident has taken place at the primary thrust path during the flight. These inspections can therefore be carried out without dismantling the rear engine attachment 150, which results in a time saving.

In the embodiment of the disclosure herein shown in FIG. 3, the aforementioned break detector 164a enters a portion of the beam 152 which is depicted by a chain dotted line due to the section. As this is more clearly shown in FIG. 2, each break detector 164a-b is going to collide with the end fitting of the beam 152 which supports a pin 162a-b. A different position is of course possible while the failure of a thrust rod 156a-b leads to the destruction of the break detector 164a-b through contact with the beam 152.

Each break detector 164a-b is detachably attached to the rudder 154, such as for example by a detachable fixing structure such as, for example, a screw or a rivet or other structure. Hence, following the destruction of the break detector 164a-b, the detector can be replaced by a new break detector 164a-b.

Each break detector 164a-b in this case takes the shape of a hollow cylinder attached on the rudder 154.

In addition to a visual inspection, it is possible to use a reference gauge which makes it possible to check whether the break detector 164a-b is deformed, even if very slightly.

In the case of a break detector 164a-b in the form of a hollow cylinder, the gauge takes the shape of a cylinder with an outer diameter which is slightly smaller than the inner diameter of the break detector 164a-b. The difference between the diameters is preferably of the sliding or close sliding type.

The disclosure herein has been described more particularly in the case of an engine attached to a reactor strut beneath a wing, but it may apply to any different kind of architecture such as, for example, an engine above the wing, at the rear, etc., while a primary thrust path is defined and it is necessary to check the state of this primary thrust path.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rear engine attachment for an aircraft for attaching an engine to a reactor strut, the rear engine attachment comprising:
   a beam for attachment to the reactor strut;
   a lifting beam mounted by a pivot connection on the beam about a main rotational axis;
   two thrust rods each exhibiting a first end attached to the lifting beam by a pivot connection and a second end for attachment to a front section of an engine, the two thrust rods and the lifting beam attached to the beam together defining a primary thrust path between the engine and the reactor strut to bear engine thrust;

for each thrust rod, the rear engine attachment exhibiting a waiting fail-safe system activated in event of a failure of the primary thrust path, wherein the waiting fail-safe system comprises:
- a lug extending from the lifting beam into an end fitting of the beam, the lug comprising an elongate hole arranged in the end fitting; and
- a pin attached to the beam, the pin crossing through the elongate hole;
- wherein, upon a failure of the primary thrust path, the pin and walls of the elongate hole are configured to engage one another, which creates an auxiliary thrust path between the engine and the reactor strut; and the rear engine attachment comprising, for each thrust rod, a break detector attached to the lifting beam which is arranged to come into contact with the end fitting of the beam in event of a failure of the primary thrust path and wherein the break detector is less rigid than the beam at contact between the two.

2. The rear engine attachment according to claim 1, wherein each break detector is detachably attached to the lifting beam.

3. The rear engine attachment according to claim 2, wherein each break detector is in a shape of a hollow cylinder.

4. The rear engine attachment according to claim 1, wherein each break detector is in a shape of a hollow cylinder.

5. An aircraft comprising:
- a reactor strut;
- an engine; and
- a rear engine attachment for attaching the engine to the reactor strut, the rear engine attachment comprising:
  - a beam for attachment to the reactor strut;
  - a lifting beam mounted by a pivot connection on the beam about a main rotational axis;
  - two thrust rods each exhibiting a first end attached to the lifting beam by a pivot connection and a second end for attachment to a front section of an engine, the two thrust rods and the lifting beam attached to the beam together defining a primary thrust path between the engine and the reactor strut to bear engine thrust;
  - for each thrust rod, the rear engine attachment exhibiting a waiting fail-safe system activated in event of a failure of the primary thrust path, wherein the waiting fail-safe system comprises:
    - a lug extending from the lifting beam into an end fitting of the beam, the lug comprising an elongate hole arranged in the end fitting; and
    - a pin attached to the beam, the pin crossing through the elongate hole;
    - wherein, upon a failure of the primary thrust path, the pin and walls of the elongate hole are configured to engage one another, which creates an auxiliary thrust path between the engine and the reactor strut; and
  - the rear engine attachment comprising, for each thrust rod, a break detector integral with the lifting beam which is arranged to come into contact with the end fitting of the beam in event of a failure of the primary thrust path and wherein the break detector is less rigid than the beam at contact between the two; and
  - wherein the beam is attached to the reactor strut and in which the second ends of each thrust rod are attached to a front section of the engine.

\* \* \* \* \*